United States Patent
Uchino et al.

(10) Patent No.: US 12,179,853 B2
(45) Date of Patent: Dec. 31, 2024

(54) STEERING CONTROL DEVICE

(71) Applicant: JTEKT CORPORATION, Kariya (JP)

(72) Inventors: Yoshiyuki Uchino, Okazaki (JP); Isao Namikawa, Okazaki (JP); Kenji Shibata, Nagoya (JP); Takafumi Sato, Obu (JP)

(73) Assignee: JTEKT CORPORATION, Kariya (JP)

( * ) Notice: Subject to any disclaimer, the term of this patent is extended or adjusted under 35 U.S.C. 154(b) by 324 days.

(21) Appl. No.: 17/829,476

(22) Filed: Jun. 1, 2022

(65) Prior Publication Data

US 2022/0388569 A1    Dec. 8, 2022

(30) Foreign Application Priority Data

Jun. 7, 2021  (JP) ................ 2021-095074

(51) Int. Cl.
*B62D 5/04*    (2006.01)
*B62D 6/00*    (2006.01)

(52) U.S. Cl.
CPC .......... *B62D 5/0463* (2013.01); *B62D 6/002* (2013.01)

(58) Field of Classification Search
CPC ......... B62D 6/00; B62D 6/002; B62D 5/0463
USPC ........................................... 701/41
See application file for complete search history.

(56) References Cited

U.S. PATENT DOCUMENTS

| | | |
|---|---|---|
| 2004/0167693 A1 | 8/2004 | Yao et al. |
| 2004/0236487 A1 | 11/2004 | Yao et al. |
| 2006/0129294 A1 | 6/2006 | Moser et al. |
| 2020/0277004 A1 | 9/2020 | Zheng et al. |
| 2020/0398891 A1 * | 12/2020 | Szepessy ............. B62D 15/021 |

FOREIGN PATENT DOCUMENTS

| | | | | |
|---|---|---|---|---|
| EP | 1 308 367 A2 | | 5/2003 | |
| JP | H10-236329 A | | 9/1998 | |
| JP | 2004231085 A | * | 8/2004 | ............... B62D 5/04 |
| JP | 2006-321434 A | | 11/2006 | |
| JP | 2007-153109 A | | 6/2007 | |
| WO | 2019/052651 A1 | | 3/2019 | |

OTHER PUBLICATIONS

Nov. 7, 2022 Extended European Search Report issued in European Patent Application No. 22177139.7.

* cited by examiner

*Primary Examiner* — Hung Q Nguyen
*Assistant Examiner* — Anthony Donald Taylor, Jr.
(74) *Attorney, Agent, or Firm* — Oliff PLC (57) ABSTRACT

A steering control device controls, as a target, a steering device including a steering actuator and a turning actuator that has a structure with a power transmission path cut off from the steering actuator. The steering control device includes a control unit. The control unit is configured to execute; turning-side synchronization control when the absolute value of a deviation amount is a value within a first range; steering-side synchronization control when the absolute value of the deviation mount is a value within a second range that is a larger value than a value within the first range; and at least one of the turning-side synchronization control and the steering-side synchronization control when the absolute value of the deviation amount is a value within a third range that is a value between a value within the first range and a value within the second range.

5 Claims, 5 Drawing Sheets

| PROCESSING PATTERN | DEVIATION AMOUNT Δθ | START-UP SYNCHRONIZATION PROCESS | NORMAL CORRECTION PROCESS |
|---|---|---|---|
| A | $\Delta\theta \leq \theta_1$ | NONE | TURNING OFFSET CONTROL |
| B | $\theta_1 < \Delta\theta \leq \theta_2$ | FIRST SIMPLIFIED SYNCHRONIZATION CONTROL | NONE |
| C | $\theta_2 < \Delta\theta \leq \theta_1 + \theta_2$ | SECOND SIMPLIFIED SYNCHRONIZATION CONTROL | TURNING OFFSET CONTROL |
| D | $\theta_1 + \theta_2 < \Delta\theta$ | REGULAR SYNCHRONIZATION CONTROL | NONE |

FIG. 5

<PROCESSING PATTERN A>

STEERING CONTROL DEVICE

CROSS-REFERENCE TO RELATED APPLICATION

This application claims priority to Japanese Patent Application No. 2021-095074 filed on Jun. 7, 2021, incorporated herein by reference in its entirety.

BACKGROUND

1. Technical Field

The disclosure relates to a steering control device.

2. Description of Related Art

There is a so-called steer-by-wire steering device in which the power transmission path between the steering wheel of the vehicle and the turning wheels of the vehicle is cut off. Such a steering device includes a steering actuator that operates to apply a steering reaction force to the steering wheel and a turning actuator that operates to turn the turning wheels. When the vehicle travels, a steering control device that controls the steering device as a target generates a steering reaction force through control of power supply to the steering actuator and turns the turning wheels through control of power supply to the turning actuator.

In the steer-by-wire steering device, the rotational position of the steering wheel is not restricted by the turning position of the turning wheels. Therefore, the steering wheel may rotate when subjected to some external force while the power to the vehicle is off. As the turning wheels do not turn in the meantime, a situation arises where the positional relationship between the rotational position of the steering wheel and the turning position of the turning wheels deviates from a predetermined correspondence relationship.

As a remedy, for example, the steering control device of Japanese Unexamined Patent Application Publication No. 2006-321434 (JP 2006-321434 A) executes a correction process on the rotational position of the steering wheel when the power to the vehicle is turned on. In the steering control device, the rotational position of the steering wheel when the power to the vehicle is turned off is stored. The steering control device calculates a deviation amount of the rotational position of the steering wheel through a comparison between the rotational position of the steering wheel when the power to the vehicle is turned off and the rotational position of the steering wheel when the power to the vehicle is turned on. Then, the steering control device operates the steering actuator such that the deviation amount assumes a zero value.

SUMMARY

It is true that the correction process executed by the steering control device of JP 2006-321434 A can improve the deviation in the positional relationship between the steering wheel and the turning wheels. The method for correcting the positional relationship between the steering wheel and the turning wheels is not limited to the method of the correction process executed by the steering control device of JP 2006-321434 A, and there is still room for proposing other methods that are more useful.

A steering control device according to an aspect of the disclosure controls, as a target, a steering device including a steering actuator that operates to apply a steering reaction force to a steering wheel of a vehicle and a turning actuator that has a structure with a power transmission path cut off from the steering actuator and that operates to turn turning wheels of the vehicle. The steering control device includes a control unit that executes synchronization control of controlling the operation of at least one of the steering actuator and the turning actuator such that a positional relationship between a rotational position of the steering wheel and a turning position of the turning wheels meets a predetermined correspondence relationship. The control unit is configured to execute processes including a deviation amount determination process of determining the magnitude of the absolute value of an amount of deviation of the positional relationship from the predetermined correspondence relationship upon power to the vehicle being turned on, and a synchronization control process of, based on a determination result of the deviation amount determination process, executing the synchronization control that is at least one of turning-side synchronization control of performing a correction process on the turning position by operating the turning actuator and steering-side synchronization control of performing a correction process on the rotational position by operating the steering actuator. The control unit is configured to execute, in the synchronization control process: the turning-side synchronization control when the absolute value of the deviation amount is a value within a first range that is a small value as to whether the deviation amount is large or small; the steering-side synchronization control when the absolute value of the deviation amount is a value within a second range that is a larger value than a value within the first range as to whether the deviation amount is large or small; and at least one of the turning-side synchronization control and the steering-side synchronization control when the absolute value of the deviation amount is a value within a third range that is a value between a value within the first range and a value within the second range.

According to this aspect, the turning-side synchronization control has the advantage of being able to perform a correction process on the positional relationship between the steering wheel and the turning wheels while the steering wheel is not rotated. This advantage can be utilized in a situation where the absolute value of the deviation amount is a value within the first range and relatively small. The steering-side synchronization control has the advantage of being able to easily perform a correction process on the positional relationship between the steering wheel and the turning wheels. This advantage can be utilized in a situation where the absolute value of the deviation amount is a value within the second range and relatively large. In a situation where the absolute value of the deviation amount is a value within the third range, at least one of the turning-side synchronization control and the steering-side synchronization control is specified to be executed, so that the advantage of each mode of control can be utilized according to the required effect. Thus, as a method of performing a correction process on the positional relationship between the steering wheel and the turning wheels, a method that utilizes the advantages of the turning-side synchronization control and the steering-side synchronization control can be proposed.

In the above aspect, the control unit may be configured to execute the steering-side synchronization control when the absolute value of the deviation amount is a value within the second range or the third range. The control unit may be configured such that the steering-side synchronization control when the absolute value of the deviation amount is a value within the second range is executed as a correction process involving two actions of rotating the steering wheel in one direction and then rotating the steering wheel in the opposite direction from the one direction, and such that the steering-side synchronization control when the absolute value of the deviation amount is a value within the third range is executed as a correction process involving one action of rotating the steering wheel in one direction.

According to this configuration, the correction process involving two actions of the steering-side synchronization control has the advantage of being less likely to cause discomfort to the driver even when the steering wheel is rotated relatively greatly. On the other hand, the correction process involving one action of the steering-side synchronization control has the advantage of being able to complete the correction process on the rotational position of the steering wheel in a short time compared with the correction process involving two actions. In this case, the advantage of the correction process involving two actions can be utilized in a situation where the steering-side synchronization control can be executed and where the absolute value of the deviation amount is a value within the second range that is a large value. The advantage of the correction process involving one action can be utilized in a situation where the steering-side synchronization control can be executed and where the absolute value of the deviation amount is a value within the third range that is a small value. This configuration is effective for utilizing the advantage of each correction process of the steering-side synchronization control that involves one or two actions.

In the above aspect, the control unit may be configured to execute, of the turning-side synchronization control and the steering-side synchronization control, the steering-side synchronization control when the absolute value of the deviation amount is a value within a fourth range that is a small value among values within the third range as to whether a value within the third range is large or small, and to execute both the turning-side synchronization control and the steering-side synchronization control when the absolute value of the deviation amount is a value within a fifth range that is a larger value than a value within the fourth range among values within the third range as to whether a value within the third range is large or small.

According to this configuration, the advantages of the turning-side synchronization control and the steering-side synchronization control can be utilized in a situation where at least one of the turning-side synchronization control and the steering-side synchronization control is executed and where the absolute value of the deviation amount is a value within the fifth range that is a large value. The advantage of the steering-side synchronization control can be utilized in a situation where at least one of the turning-side synchronization control and the steering-side synchronization control is executed and where the absolute value of the deviation amount is a value within the fourth range that is a small value. This configuration is effective for utilizing the advantages of the turning-side synchronization control and the steering-side synchronization control.

In the above configuration, the control unit may be configured to execute, as the turning-side synchronization control and the steering-side synchronization control when the absolute value of the deviation amount is a value within the fifth range, the steering-side synchronization control until the absolute value of the deviation amount assumes a value within the first range and the turning-side synchronization control after the absolute value of the deviation amount assumes a value within the first range.

According to this configuration, the advantage of the steering-side synchronization control that can be utilized in a situation where the absolute value of the deviation amount is relatively large can be more suitably utilized in a situation where both the turning-side synchronization control and the steering-side synchronization control are executed and where the absolute value of the deviation amount is a value within the fifth range that is a large value. This configuration is effective from the viewpoint of easily performing a correction process on the positional relationship between the steering wheel and the turning wheel.

In the above aspect, the control unit may be configured to, when executing the turning-side synchronization control, perform a correction process on the turning position after the power to the vehicle is turned on and the vehicle starts traveling, and when executing the steering-side synchronization control, perform a correction process on the rotational position after the power to the vehicle is turned on and before the vehicle starts traveling.

According to this configuration, the turning-side synchronization control has the advantage of being able to shorten the time taken for the vehicle to start traveling after the power to the vehicle is turned on. This advantage can be more effectively utilized in a situation where the absolute value of the deviation amount is a value within the first range and relatively small. The steering-side synchronization control has an advantage in that the vehicle's behavior is less likely to cause discomfort to the driver. This advantage can be more effectively utilized in a situation where the absolute value of the deviation amount is a value within the second range and relatively large. In this case, the correction process on the positional relationship between the steering wheel and the turning wheels can produce both a shortening effect on the period from when the power to the vehicle is turned on until the vehicle starts traveling and a reducing effect on the likelihood of the vehicle's behavior causing discomfort to the driver.

The steering control device having these aspects can utilize the advantages of the turning-side synchronization control and the steering-side synchronization control as a method of performing a correction process on the positional relationship between the steering wheel and the turning wheels.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
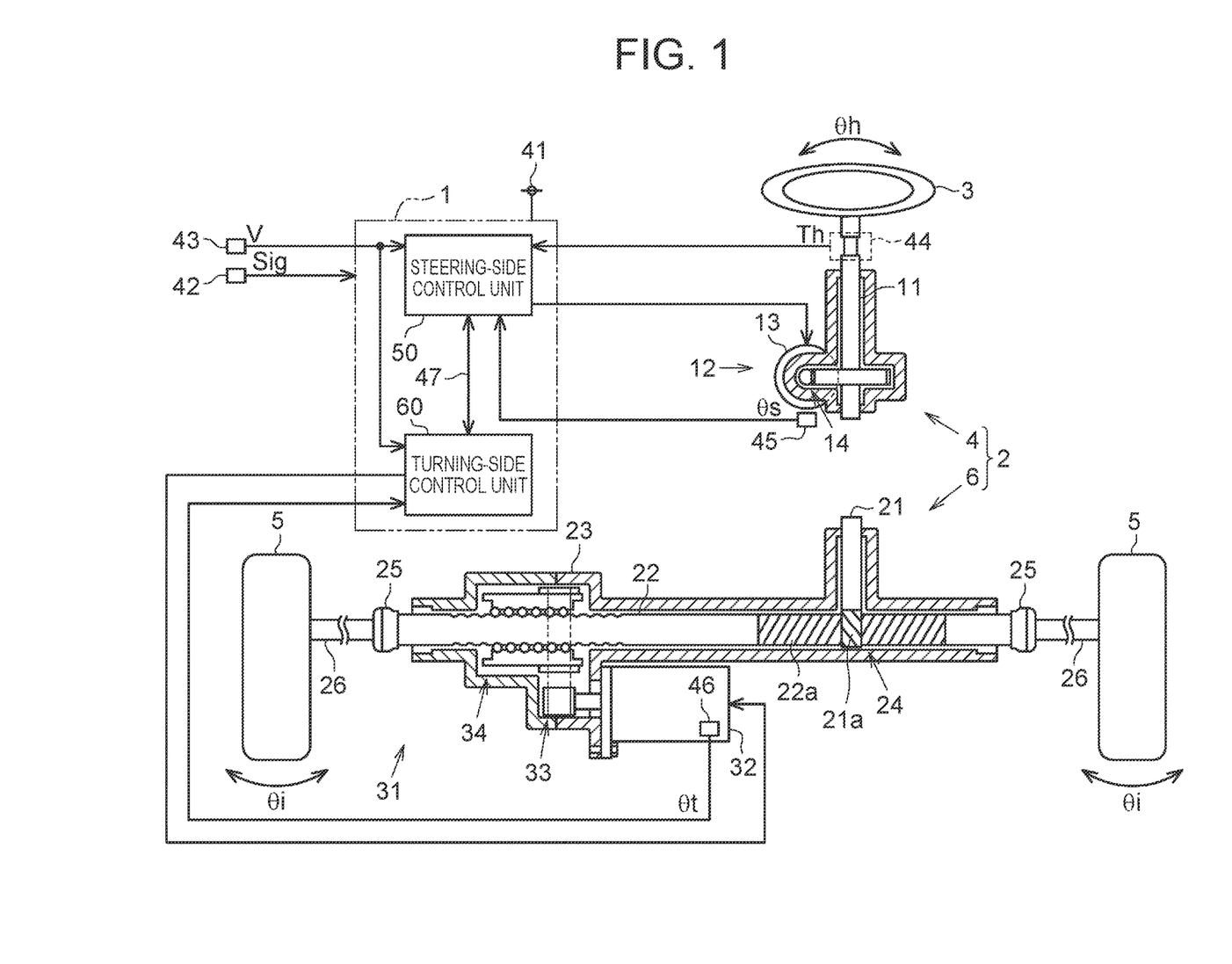
FIG. 1 is a schematic configuration diagram of a steer-by-wire steering device.

One embodiment of a steering control device will be described below in accordance with the drawings. As shown in FIG. 1, a steering device 2 that is a control target of a steering control device 1 is configured as a vehicle steering device of steer-by-wire type. The steering device 2 includes a steering section 4 and a turning section 6. The steering section 4 is steered by a driver through a steering wheel 3 of the vehicle. The turning section 6 turns left and right turning wheels 5 of the vehicle according to steering input into the steering section 4 by the driver. The steering device 2 of this embodiment has a structure in which a power transmission path between the steering section 4 and the turning section 6 is mechanically cut off at all times. This means a structure in which a power transmission path between a steering actuator 12 to be described later and a turning actuator 31 to be described later is mechanically cut off at all times.

The steering section 4 includes a steering shaft 11 and the steering actuator 12. The steering shaft 11 is coupled to the steering wheel 3. The steering actuator 12 has a steering-side motor 13 that is a drive source and a steering-side speed reduction mechanism 14. The steering-side motor 13 is a reaction force motor that applies a steering reaction force, which is a force resisting steering, to the steering wheel 3 through the steering shaft 11. The steering-side motor 13 is coupled to the steering shaft 11 through the steering-side speed reduction mechanism 14 that is formed by, for example, a worm and wheel set. As the steering-side motor 13 of this embodiment, for example, a three-phase brushless motor is adopted.

The turning section 6 includes a pinion shaft 21, a rack shaft 22 as a turning shaft, and a rack housing 23. The pinion shaft 21 and the rack shaft 22 are coupled together at a predetermined intersection angle. Pinion teeth 21a formed on the pinion shaft 21 and rack teeth 22a formed on the rack shaft 22 are meshed with each other to form a rack-and-pinion mechanism 24. Thus, the pinion shaft 21 corresponds to a rotating shaft of which the rotation angle can be converted into a turning angle θi that is a turning position of the turning wheels 5. The rack housing 23 houses the rack-and-pinion mechanism 24. One end of the pinion shaft 21 on the opposite side from a side that is coupled to the rack shaft 22 protrudes from the rack housing 23. Both ends of the rack shaft 22 protrude from both ends of the rack housing 23 in an axial direction. A tie rod 26 is coupled to each end of the rack shaft 22 through a rack end 25 formed by a ball joint. Leading ends of the tie rods 26 are coupled to knuckles (not shown) on which the left and right turning wheels 5 are respectively mounted.

The turning section 6 includes the turning actuator 31. The turning actuator 31 includes a turning-side motor 32 that is a drive source, a transmission mechanism 33, and a conversion mechanism 34. The turning-side motor 32 applies a turning force for turning the turning wheels 5 to the rack shaft 22 through the transmission mechanism 33 and the conversion mechanism 34. The turning-side motor 32 transmits rotation to the conversion mechanism 34 through the transmission mechanism 33 that is formed by, for example, a belt transmission mechanism. The transmission mechanism 33 converts rotation of the turning-side motor 32 into reciprocating motion of the rack shaft 22 through the conversion mechanism 34 that is formed by, for example, a ball screw mechanism. As the turning-side motor 32 of this embodiment, for example, a three-phase brushless motor is adopted.

In the steering device 2 thus configured, the turning angle θi of the turning wheels 5 is changed as a motor torque is applied as a turning force from the turning actuator 31 to the rack shaft 22 according to steering operation by the driver. Meanwhile, a steering reaction force resisting the steering by the driver is applied from the steering actuator 12 to the steering wheel 3. Thus, in the steering device 2, a steering torque Th required to steer the steering wheel 3 is changed by the steering reaction force that is a motor torque applied from the steering actuator 12.

The reason for providing the pinion shaft 21 is to support the rack shaft 22 along with the pinion shaft 21 inside the rack housing 23. Specifically, the rack shaft 22 is supported so as to be movable along its axial direction and is pressed toward the pinion shaft 21 by a support mechanism (not shown) provided in the steering device 2. Thus, the rack shaft 22 is supported inside the rack housing 23. Alternatively, the pinion shaft 21 may not be used and other support mechanism that supports the rack shaft 22 in the rack housing 23 may be provided.

Electrical Configuration of Steering Device 2

As shown in FIG. 1, the steering-side motor 13 and the turning-side motor 32 are connected to the steering control device 1. The steering control device 1 controls the operation of the steering-side motor 13 and the turning-side motor 32. A main power source 41 is connected to the steering control device 1, i.e., the steering device 2. The main power source 41 is a secondary battery installed in the vehicle, and serves as a power source of electricity supplied for the motors 13, 32 to operate as well as a power source of electricity supplied for the steering control device 1, i.e., the steering device 2, to operate.

A start signal Sig showing an on or off state of a start switch 42, such as an ignition switch, of the vehicle is input into the steering control device 1. The start switch 42 is provided between the steering control device 1 and the main power source 41. The start switch 42 is manipulated to activate a travel drive source, such as an engine, of the vehicle and thereby start various functions to allow operation of the vehicle. Electricity from the main power source 41 is switched between being supplied and being shut off through manipulation of the start switch 42. In this embodiment, the operation state of the steering device 2 is linked to the operation state of the vehicle.

Further, detection results of various sensors are input into the steering control device 1. Examples of the various sensors include a vehicle speed sensor 43, a torque sensor 44, a steering-side rotation angle sensor 45, and a turning-side rotation angle sensor 46.

The vehicle speed sensor 43 detects a vehicle speed V that is a travel speed of the vehicle. The torque sensor 44 detects the steering torque Th that is a value showing a torque applied to the steering shaft 11 by the driver's steering operation. The steering-side rotation angle sensor 45 detects a rotation angle θs that is the angle of a rotating shaft of the steering-side motor 13 within a 360-degree range. The turning-side rotation angle sensor 46 detects a rotation angle θt that is the angle of a rotating shaft of the turning-side motor 32 within a 360-degree range.

Specifically, the torque sensor 44 is provided on the steering shaft 11, at a part on the side of the steering wheel 3 relative to the steering-side speed reduction mechanism 14. The torque sensor 44 detects the steering torque Th based on twisting of a torsion bar (not shown) provided at an intermediate point on the steering shaft 11. The steering torque Th is detected, for example, as a positive value when the vehicle is steered rightward and as a negative value when the vehicle is steered leftward.

The steering-side rotation angle sensor 45 is provided in the steering-side motor 13. The rotation angle $\theta s$ of the steering-side motor 13 is used to calculate a steering angle $\theta h$. The steering-side motor 13 and the steering shaft 11 are interlocked with each other through the steering-side speed reduction mechanism 14. Accordingly, there is a correlation between the rotation angle $\theta s$ of the steering-side motor 13 and the rotation angle of the steering shaft 11, and, by extension, the steering angle $\theta h$ that is a rotation angle showing the rotational position of the steering wheel 3. Therefore, the steering angle $\theta h$ can be obtained based on the rotation angle $\theta s$ of the steering-side motor 13. The rotation angle $\theta s$ is detected, for example, as a positive value when the vehicle is steered rightward and as a negative value when the vehicle is steered leftward.

The turning-side rotation angle sensor 46 is provided in the turning-side motor 32. The rotation angle $\theta t$ of the turning-side motor 32 is used to calculate a pinion angle $\theta p$. The turning-side motor 32 and the pinion shaft 21 are interlocked with each other through the transmission mechanism 33, the conversion mechanism 34, and the rack-and-pinion mechanism 24. Accordingly, there is a correlation between the rotation angle $\theta t$ of the turning-side motor 32 and the pinion angle $\theta p$ that is the rotation angle of the pinion shaft 21. Therefore, the pinion angle $\theta p$ can be obtained based on the rotation angle $\theta t$ of the turning-side motor 32. The pinion shaft 21 is meshed with the rack shaft 22. Accordingly, there is a correlation also between the pinion angle $\theta p$ and the amount of movement of the rack shaft 22. Thus, the pinion angle $\theta p$ is a value reflecting the turning angle $\theta i$ that shows the turning position of the turning wheels 5. The rotation angle $\theta t$ is detected, for example, as a positive value when the vehicle is steered rightward and as a negative value when the vehicle is steered leftward.

Functions of Steering Control Device 1

As shown in FIG. 1, the steering control device 1 has a steering-side control unit 50 and a turning-side control unit 60. The steering-side control unit 50 controls power supply to the steering-side motor 13. The turning-side control unit 60 controls power supply to the turning-side motor 32.

In the steering control device 1, the steering-side control unit 50 and the turning-side control unit 60 each include a CPU, such as a central processor, and a memory that are not shown. In the steering-side control unit 50 and the turning-side control unit 60, the CPU executes a program stored in the memory on a cycle of a predetermined calculation period. Thus, various processes are executed. The steering-side control unit 50 and the turning-side control unit 60 send and receive information to and from each other through a local network 47, such as a serial communication network. In this embodiment, the steering-side control unit 50 and the turning-side control unit 60 are examples of the control unit.

Specifically, the steering torque Th, the vehicle speed V, and the rotation angle $\theta s$ are input into the steering-side control unit 50. Based on the steering torque Th and the vehicle speed V, the steering-side control unit 50 calculates a target reaction force torque that is a target value of the steering reaction force. Then, the steering-side control unit 50 controls the steering-side motor 13 such that a motor torque according to the target reaction force torque is generated. Thus, the steering reaction force is applied to the steering section 4.

Further, the steering-side control unit 50 converts the rotation angle $\theta s$ into a cumulative angle including a range that exceeds 360 degrees by, for example, counting the number of rotations of the steering-side motor 13 from a steering neutral position that is the position of the steering wheel 3 when the vehicle is traveling straight forward. Then, the steering-side control unit 50 calculates the steering angle $\theta h$ by multiplying the cumulative angle obtained by conversion by a conversion factor based on a rotation speed ratio of the steering-side speed reduction mechanism 14. The steering angle $\theta h$ thus obtained is output to the turning-side control unit 60 through the local network 47.

The vehicle speed V, the rotation angle $\theta t$, and the steering angle $\theta h$ are input into the turning-side control unit 60. The turning-side control unit 60 converts the rotation angle $\theta t$ into a cumulative angle including a range that exceeds 360° by, for example, counting the number of rotations of the turning-side motor 32 from a rack neutral position that is the position of the rack shaft 22 when the vehicle is traveling straight forward. Then, the turning-side control unit 60 calculates the pinion angle $\theta p$ that is the actual rotation angle of the pinion shaft 21 by multiplying the cumulative angle obtained by conversion by a conversion factor based on a rotation speed ratio of the transmission mechanism 33, a lead of the conversion mechanism 34, and a rotation speed ratio of the rack-and-pinion mechanism 24.

Further, the turning-side control unit 60 calculates a target pinion angle $\theta p^*$ that is a target value of the pinion angle $\theta p$ based on the steering angle $\theta h$. In this case, the turning-side control unit 60 calculates the target pinion angle $\theta p^*$ corresponding to the steering angle $\theta h$ based on a steering angle ratio. The steering angle ratio refers to the ratio between the steering angle $\theta h$ and the pinion angle $\theta p$ that reflects the turning angle $\theta i$, and changes with the steering angle $\theta h$ and the vehicle speed V, for example. The turning-side control unit 60 calculates a target turning torque that is a target value of the turning force by executing feedback control such that the pinion angle $\theta p$ adapts to the target pinion angle $\theta p^*$. Then, the turning-side control unit 60 controls the turning-side motor 32 such that a motor torque according to the target turning torque is generated. As a result, a turning force is applied to the turning section 6. Thus, the turning-side control unit 60 controls the steering device 2 such that the positional relationship between the steering angle $\theta h$ and the turning angle $\theta i$ meets a predetermined correspondence relationship that is determined according to the steering angle ratio.

Start Switch 42 in Off State

The steering wheel 3 may rotate when subjected to some external force while the start switch 42 is off. In this case, since the start switch 42 is off, the turning-side control unit 60 does not turn the turning wheels 5 through control of the turning-side motor 32. As a result, the positional relationship between the steering angle $\theta h$ and the turning angle $\theta i$ deviates from the predetermined correspondence relationship. The same applies to a case where the turning wheels 5 turn when subjected to some external force while the start switch 42 is off.

As a remedy, the steering control device 1 is configured to execute synchronization control when the positional relationship between the steering angle $\theta h$ and the turning angle $\theta i$, i.e., the steering angle $\theta h$ and the pinion angle $\theta p$, is not the predetermined correspondence relationship such that the positional relationship meets the predetermined correspondence relationship. The steering control device 1 executes synchronization control of at least one of steering-side synchronization control and turning-side synchronization control.

The steering-side synchronization control is control of operating the steering actuator 12 through control of the steering-side motor 13. Specifically, in the steering-side synchronization control, a correction process is performed on the rotational position of the steering wheel 3 such that the positional relationship between the steering angle θh and the pinion angle θp meets the predetermined correspondence relationship. The steering-side synchronization control is executed as a start-up synchronization process that is one of processes executed by the steering-side control unit 50 at a timing after the start switch 42 is turned on and before the vehicle starts traveling.

The turning-side synchronization control is control of operating the turning actuator 31 through control of the turning-side motor 32. Specifically, in the turning-side synchronization control, a correction process is performed on the turning position of the turning wheels 5 such that the positional relationship between the steering angle θh and the pinion angle θp meets the predetermined correspondence relationship. The turning-side synchronization control is executed as a normal correction process that is one of processes executed by the turning-side control unit 60 at a timing when the start switch 42 is turned on and after the vehicle starts traveling.

Start-Up Synchronization Process

Figure 2:
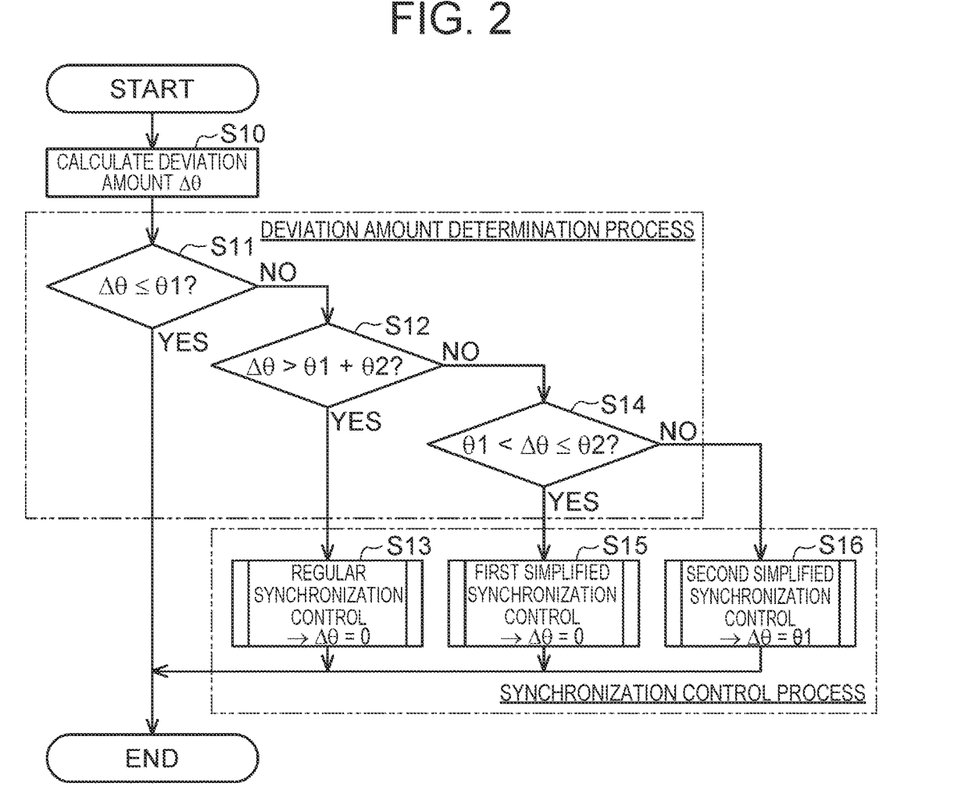
FIG. 2 is a flowchart showing the flow of a start-up synchronization process in relation to synchronization control.

FIG. 2 is one example of a flowchart of the processing procedure of the start-up synchronization process executed by the steering-side control unit 50. The steering-side control unit 50 executes the following start-up synchronization process by executing a periodic process on a cycle of a control period. The trigger for the start-up synchronization process to start is that the start switch 42 is turned on and power supply to the steering control device 1 starts.

In the start-up synchronization process, the steering-side control unit 50 calculates a deviation amount Δθ (step S10). This process is a process for detecting a state variable that serves as a reference for determining the degree of deviation of the positional relationship between the steering angle θh and the pinion angle θp from the predetermined correspondence relationship upon the start switch 42 being turned on. In this embodiment, the deviation amount Δθ is the magnitude of the absolute value of an amount of deviation of the positional relationship between the steering angle θh and the pinion angle θp from the predetermined correspondence relationship upon the start switch 42 being turned on. For example, the deviation amount Δθ is calculated as the absolute value of the difference between the steering angle θh and a turning-converted angle θp_s that is obtained based on the steering angle ratio as a value corresponding to the pinion angle θp. The turning-side control unit 60 obtains the turning-converted angle θp_s corresponding to the pinion angle θp by calculation based on the steering angle ratio.

Also while the start switch 42 is off, as long as the main power source 41 is connected, the steering-side control unit 50 of this embodiment retains the value of the steering angle θh at a point when the start switch 42 is turned off and monitors the rotation of the steering-side motor 13. When the steering-side motor 13 has been rotating while the start switch 42 is off, the next time the start switch 42 is turned on, the steering-side control unit 50 calculates the steering angle θh that has changed by an amount corresponding to that rotation of the steering-side motor 13. The same applies to the turning-side control unit 60. Specifically, also while the start switch 42 is off, as long as the main power source 41 is connected, the turning-side control unit 60 retains the value of the pinion angle θp at a point when the start switch 42 is turned off and monitors the rotation of the turning-side motor 32. When the turning-side motor 32 has been rotating while the start switch 42 is off, the next time the start switch 42 is turned on, the turning-side control unit 60 calculates the pinion angle θp that has changed by an amount corresponding to that rotation of the turning-side motor 32. The pinion angle θp thus calculated when the start switch 42 is turned on is output to the steering-side control unit 50 as the turning-converted angle θp_s calculated based on the steering angle ratio.

Subsequently, the steering-side control unit 50 determines whether the deviation amount Δθ is equal to or smaller than a first threshold value θ1 (Δθ≤θ1) (step S11). This process corresponds to a deviation amount determination process for determining whether the steering-side synchronization control need be executed.

In this embodiment, the first threshold value θ1 is set to a maximum value among values within a range that is experimentally obtained such that even when the vehicle is made to start traveling while having the deviation amount Δθ, this behavior of the vehicle is less likely to cause discomfort to the driver. In this embodiment, a value equal to or smaller than the first threshold value θ1 corresponds to a value within a first range.

When the steering-side control unit 50 determines in step S11 that the deviation amount Δθ is equal to or smaller than the first threshold value θ1 (step S11: YES), the steering-side control unit 50 determines that the steering-side synchronization control need not be executed. Based on the determination result of YES in step S11, the steering-side control unit 50 ends the start-up synchronization process by deeming the start-up synchronization process as completed. In this case, the steering-side control unit 50 generates a synchronization process completion flag FLG as information showing completion of the start-up synchronization process, and outputs the synchronization process completion flag FLG to the turning-side control unit 60 through the local network 47. Thereafter, the steering-side control unit 50 executes steering-side control during energization for the steer-by-wire steering device 2.

On the other hand, when the steering-side control unit 50 determines in step S11 that the deviation amount Δθ is not equal to or smaller than the first threshold value θ1 (step S11: NO), the steering-side control unit 50 determines that the steering-side synchronization control need be executed. Based on the determination result of NO in step S11, the steering-side control unit 50 determines whether the deviation amount Δθ is larger than the sum of the first threshold value θ1 and a second threshold value θ2 (Δθ>θ1+θ2) (step S12). This process corresponds to the deviation amount determination process for determining the specific contents of the correction process of the steering-side synchronization control in determining that the steering-side synchronization control need be executed.

In this embodiment, the second threshold value θ2 is set to a maximum value among values within a range that is experimentally obtained such that even when the steering wheel 3 is rotated so as to bring the deviation amount Δθ close to a zero value, this rotation of the steering wheel 3 is less likely to cause discomfort to the driver. Thus, a value larger than the sum of the threshold values θ1, θ2 shows that both making the vehicle start traveling with that deviation amount Δθ and rotating the steering wheel 3 so as to bring the deviation amount Δθ close to a zero value are likely to cause discomfort to the driver. In this embodiment, a value larger than the sum of the threshold values θ1, θ2 corresponds to a value within a second range.

When the steering-side control unit 50 determines in step S12 that the deviation amount Δθ is larger than the sum of the threshold values θ1, θ2 (step S12: YES), the steering-side control unit 50 determines to execute regular synchronization control as the steering-side synchronization control. In this case, the steering-side control unit 50 executes the regular synchronization control such that the deviation amount Δθ assumes a zero value (Δθ=0) (step S13). This process corresponds to a synchronization control process that is executed based on the determination results of steps S11, S12 corresponding to the deviation amount determination process. In the regular synchronization control, a correction process is performed on the rotational position of the steering wheel 3 by rotating the steering wheel 3 such that the deviation amount Δθ assumes a zero value before the vehicle starts traveling. In this embodiment, the regular synchronization control is specified as a correction process involving two actions of rotating the steering wheel 3 in one direction and then rotating it in the opposite direction from the one direction.

Specifically, for the regular synchronization control, the steering-side control unit 50 calculates a synchronization target steering angle θh* that is the steering angle θh at which the deviation amount Δθ assumes a zero value. In this case, the steering-side control unit 50 calculates, as the synchronization target steering angle θh*, the value of the turning-converted angle θp_s that was used to calculate the deviation amount Δθ.

Further, the steering-side control unit 50 calculates a relay target steering angle θhr* that is the steering angle θh serving as a relay point in reaching the synchronization target steering angle θh*. In this case, the steering-side control unit 50 calculates, as the relay target steering angle θ hr*, an angle obtained by further shifting one of the steering angle θh and the synchronization target steering angle θh* that is located on a positive value side toward the positive value side by a predetermined amount.

Then, the steering-side control unit 50 executes feedback control such that the steering angle θh matches the relay target steering angle θhr*, and thereby controls the steering-side motor 13 so as to rotate the steering wheel 3. This can be called the first stage of the regular synchronization control in relation to the regular synchronization control. As a result, a rotary force toward the positive value side of the steering angle θh is applied to the steering wheel 3. Thus, the steering-side control unit 50 controls the operation of the steering actuator 12 such that the steering wheel 3 rotates in the one direction of the rightward direction.

Subsequently, when the steering angle θh matches the relay target steering angle θhr*, the steering-side control unit 50 executes feedback control such that the steering angle θh matches the synchronization target steering angle θh*, and thereby controls the steering-side motor 13 so as to further rotate the steering wheel 3. This can be called the second stage of the regular synchronization control executed following the first stage in relation to the regular synchronization control. As a result, a rotary force toward a negative value side of the steering angle θh is applied to the steering wheel 3. Thus, the steering-side control unit 50 controls the operation of the steering actuator 12 such that the steering wheel 3 rotates in the leftward direction that is the opposite direction from the rightward direction.

Thereafter, when the steering angle θh matches the synchronization target steering angle θh*, the steering-side control unit 50 ends the regular synchronization control, i.e., the process of step S13, and ends the start-up synchronization process by deeming the start-up synchronization process as completed. In this case, as with when determining YES in step S11, the steering-side control unit 50 generates the synchronization process completion flag FLG and outputs it to the turning-side control unit 60, and then executes the steering-side control during energization for the steer-by-wire steering device 2.

On the other hand, when the steering-side control unit 50 determines in step S12 that the deviation amount Δθ is not larger than the sum of the threshold values θ1, θ2 (step S12: NO), the steering-side control unit 50 determines that the deviation amount Δθ is equal to or smaller than the sum of the threshold values θ1, θ2 among values larger than the first threshold value θ1. Based on the determination result of NO in step S12, the steering-side control unit 50 determines whether the deviation amount Δθ is larger than the first threshold value θ1 and equal to or smaller than the second threshold value θ2 (θ1<Δθ ≤θ2) (step S14). This process corresponds to the deviation amount determination process for determining whether the deviation amount Δθ is within a range of smaller values among values equal to or smaller than the sum of the threshold values θ1, θ2.

In this embodiment, a value larger than the first threshold value θ1 and equal to or smaller than the second threshold value θ2 shows that making the vehicle start traveling with that deviation amount Δθ is likely to cause discomfort to the driver, but that rotating the steering wheel 3 so as to bring the deviation amount Δθ close to a zero value is less likely to cause discomfort to the driver. In this embodiment, a value equal to or smaller than the sum of the threshold values θ1, θ2 corresponds to a value within a third range. A value larger than the first threshold value θ1 and equal to or smaller than the second threshold value θ2 corresponds to a value within a fourth range that is a small value among values within the third range as to whether a value is large or small.

When the steering-side control unit 50 determines in step S14 that the deviation amount Δθ is larger than the first threshold value θ1 and equal to or smaller than the second threshold values θ2 (step S14: YES), the steering-side control unit 50 determines to execute first simplified synchronization control as the steering-side synchronization control. In this case, the steering-side control unit 50 executes the first simplified synchronization control such that the deviation amount Δθ assumes a zero value (Δθ=0) (step S15). This process corresponds to the synchronization control process that is executed based on the determination results of steps S11, S12, S14 corresponding to the deviation amount determination process. In the first simplified synchronization control, a correction process is performed on the rotational position of the steering wheel 3 by rotating the steering wheel 3 such that the deviation amount Δθ assumes a zero value before the vehicle starts traveling. In this embodiment, the first simplified synchronization control is specified as a correction process involving one action of rotating the steering wheel 3 in one direction.

Specifically, for the first simplified synchronization control, the steering-side control unit 50 calculates the synchronization target steering angle θh* that is the steering angle θh at which the deviation amount Δθ assumes a zero value. In this case, as with when executing the regular synchronization control, the steering-side control unit 50 calculates, as the synchronization target steering angle θh*, the value of the turning-converted angle θp_s that was used to calculate the deviation amount Δθ.

Then, the steering-side control unit 50 executes feedback control such that the steering angle $\theta h$ matches the synchronization target steering angle $\theta h^*$, and thereby controls the steering-side motor 13 so as to rotate the steering wheel 3. As a result, a rotary force toward the synchronization target steering angle $\theta h^*$ is applied to the steering wheel 3. Thus, the steering-side control unit 50 controls the operation of the steering actuator 12 such that the steering wheel 3 rotates in one of the leftward and rightward directions.

Thereafter, when the steering angle $\theta h$ matches the synchronization target steering angle $\theta h^*$, the steering-side control unit 50 ends the first simplified synchronization control, i.e., the process of step S15, and ends the start-up synchronization process by deeming the start-up synchronization process as completed. In this case, as with when determining YES in step S11, the steering-side control unit 50 generates the synchronization process completion flag FLG and outputs it to the turning-side control unit 60, and then executes the steering-side control during energization for the steer-by-wire steering device 2.

On the other hand, when the steering-side control unit 50 determines in step S14 that the deviation amount $\Delta\theta$ is larger than the first threshold value $\theta 1$ and not equal to or smaller than the second threshold value $\theta 2$ (step S14: NO), the steering-side control unit 50 determines to execute second simplified synchronization control as the steering-side synchronization control. This process corresponds to the deviation amount determination process for determining that the deviation amount $\Delta\theta$ is a value larger than the second threshold value $\theta 2$ and equal to or smaller than the sum of the threshold values $\theta 1$, $\theta 2$, i.e., that the deviation amount $\Delta\theta$ is a larger value among values equal to or smaller than the sum of the threshold values $\theta 1$, $\theta 2$.

In this embodiment, a value larger than the second threshold value $\theta 2$ and equal to or smaller than the sum of the threshold values $\theta 1$, $\theta 2$ shows that both making the vehicle start traveling with that deviation amount $\Delta\theta$ and rotating the steering wheel 3 so as to bring the deviation amount $\Delta\theta$ close to a zero value are likely to cause discomfort to the driver. However, the range of values larger than the first threshold value $\theta 1$ is contained within the range of values equal to or smaller than the second threshold value $\theta 2$. This means that making the vehicle start traveling with the deviation amount $\Delta\theta$ within a range equal to or smaller than the first threshold value $\theta 1$ is less likely to cause discomfort to the driver, as well as that rotating the steering wheel 3 so as to bring the deviation amount $\Delta\theta$ close to a zero value within a range of values larger than the first threshold value $\theta 1$ is also less likely to cause discomfort to the driver. In this embodiment, a value larger than the second threshold value $\theta 2$ and equal to or smaller than the sum of the threshold values $\theta 1$, $\theta 2$ corresponds to a value within a fifth range that is a larger value than a value within the fourth range among values within the third range as to whether a value is large or small.

When the steering-side control unit 50 determines NO in step S14, the steering-side control unit 50 executes the second simplified synchronization control such that the deviation amount $\Delta\theta$ assumes the first threshold value $\theta 1$ ($\Delta\theta=\theta 1$) (step S16). This process corresponds to the synchronization control process that is executed based on the determination results of steps S11, S12, S14 corresponding to the deviation amount determination process. In the second simplified synchronization control, a correction process is performed on the rotational position of the steering wheel 3 by rotating the steering wheel 3 such that the deviation amount $\Delta\theta$ assumes the first threshold value $\theta 1$ before the vehicle starts traveling. In this embodiment, as with the first simplified synchronization control, the second simplified synchronization control is specified as a correction process involving one action of rotating the steering wheel 3 in one direction.

Specifically, for the second simplified synchronization control, the steering-side control unit 50 calculates the synchronization target steering angle $\theta h^*$ that is the steering angle $\theta h$ at which the deviation amount $\Delta\theta$ assumes the first threshold value $\theta 1$. In this case, the steering-side control unit 50 calculates, as the synchronization target steering angle $\theta h^*$, a value obtained by shifting the value of the turning-converted angle $\theta p\_s$ that was used to calculate the deviation amount $\Delta\theta$ toward the steering angle $\theta h$ by the first threshold value $\theta 1$.

Then, the steering-side control unit 50 executes feedback control such that the steering angle $\theta h$ matches the synchronization target steering angle $\theta h^*$, and thereby controls the steering-side motor 13 so as to rotate the steering wheel 3. As a result, a rotary force toward the synchronization target steering angle $\theta h^*$ is applied to the steering wheel 3. Thus, the steering-side control unit 50 controls the operation of the steering actuator 12 such that the steering wheel 3 rotates in one of the leftward and rightward directions.

Thereafter, when the steering angle $\theta h$ matches the synchronization target steering angle $\theta h^*$, the steering-side control unit 50 ends the second simplified synchronization control, i.e., the process of step S16, and ends the start-up synchronization process by deeming the start-up synchronization process as completed. In this case, as with when determining YES in step S11, the steering-side control unit 50 generates the synchronization process completion flag FLG and outputs it to the turning-side control unit 60, and then executes the steering-side control during energization for the steer-by-wire steering device 2.

Normal Correction Process

Figure 3:
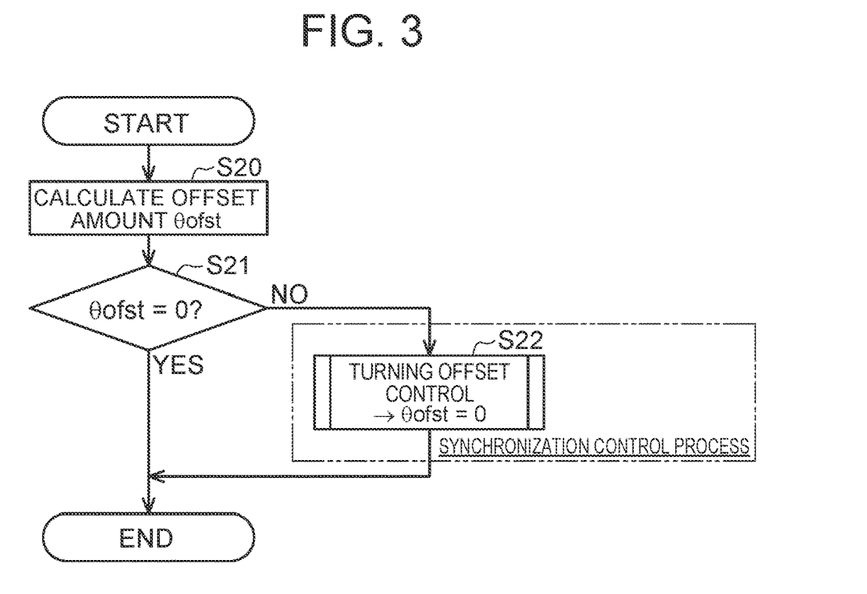
FIG. 3 is a flowchart showing the flow of a normal correction process in relation to the synchronization control.

FIG. 3 is one example of a flowchart of the processing procedure of the normal correction process executed by the turning-side control unit 60. The turning-side control unit 60 executes the following normal correction process by executing a periodic process on a cycle of a control period. The trigger for the normal correction process to start is that the synchronization process completion flag FLG is input after the start switch 42 is turned on and power supply to the steering control device 1 starts. This means that the trigger for the normal correction process to start is that the start-up synchronization process executed by the steering-side control unit 50 is completed. Since the synchronization process completion flag FLG was input, the turning-side control unit 60 has been executing turning-side control during energization for the steer-by-wire steering device 2. Thus, the normal correction process is executed as one of processes of the turning-side control during energization executed by the turning-side control unit 60.

In the normal correction process, the turning-side control unit 60 calculates an offset amount $\theta ofst$ (step S20). This process is a process for detecting a state variable that serves as a reference for determining the deviation amount $\Delta\theta$ remaining as a result of the start-up synchronization process.

In this embodiment, the offset amount $\theta ofst$ is a magnitude that takes into account the direction of the amount of deviation of the positional relationship between the steering angle $\theta h$ and the pinion angle $\theta p$ from the predetermined correspondence relationship after the start switch 42 is turned on and the start-up synchronization process executed by the steering-side control unit 50 is completed. For example, the offset amount $\theta ofst$ is calculated by subtracting the pinion angle $\theta p$ from the target pinion angle $\theta p^*$ that is obtained based on the steering angle ratio as a value corresponding to the steering angle θh. The steering angle θh used to calculate the offset amount θofst is the steering angle θh that the steering-side control unit 50 outputs to the local network 47 in the first control period after completion of the start-up synchronization process.

Subsequently, the turning-side control unit 60 determines whether the offset amount θofst is equal to a zero value (θofst=0) (step S21). This process is a process for determining whether the turning-side synchronization control need be executed. In this embodiment, the offset amount θofst is a value corresponding to the deviation amount Δθ that is basically equal to or smaller than the first threshold value θ1. This is because the deviation amount Δθ remaining as a result of the start-up synchronization process is basically equal to or smaller than the first threshold value θ1. Thus, the offset amount θofst is a value within such a range that even when the vehicle is made to start traveling while having the offset amount θofst, this behavior of the vehicle is less likely to cause discomfort to the driver.

When the turning-side control unit 60 determines in step S21 that the offset amount θofst is equal to a zero value (step S21: YES), the turning-side control unit 60 determines that the turning-side synchronization control need not be executed. Based on the determination result of YES in step S21, the turning-side control unit 60 ends the normal correction process by deeming the normal correction process as completed.

On the other hand, when the turning-side control unit 60 determines in step S21 that the offset amount θofst is not equal to a zero value (step S21: NO), the turning-side control unit 60 determines that the turning-side synchronization control need be executed. In this case, the turning-side control unit 60 executes turning offset control as the turning-side control such that the offset amount θofst assumes a zero value (θofst=0) (step S22). This process corresponds to the synchronization control process that is executed based on the determination results of steps S11, S12, S14 of the start-up synchronization process corresponding to the deviation amount determination process. In the turning offset control, a correction process is performed on the turning position of the turning wheels 5 by turning the turning wheels 5 such that the offset amount θofst assumes a zero value after the vehicle starts traveling.

Specifically, for the turning offset control, the turning-side control unit 60 calculates a compensated target pinion angle θp* that is obtained by subtracting the offset amount θofst from the target pinion angle θp* that is obtained based on the steering angle ratio as a value corresponding to the steering angle θh.

Then, until the offset amount θofst assumes a zero value, the turning-side control unit 60 executes feedback control as the turning-side control during energization such that the pinion angle θp adapts to the compensated target pinion angle θp*. This allows the vehicle to start traveling while having the offset amount θofst, even when the offset amount θofst is not equal to a zero value. Thus, the turning-side control unit 60 controls the operation of the turning actuator 31 such that the vehicle can start traveling while having the offset amount θofst.

Further, on the condition of start of travel of the vehicle that is detected based on the vehicle speed V, the turning-side control unit 60 performs a reduction process of gradually bringing the offset amount θofst close to a zero value until the offset amount θofst assumes a zero value. In this case, for example, the turning-side control unit 60 makes the amount of reduction larger when the turning speed or the vehicle speed V that corresponds to an amount of change in the pinion angle θp is larger.

Thereafter, when the offset amount θofst matches a zero value, the turning-side control unit 60 ends the turning offset control, i.e., the process of step S22, and ends the normal correction process by deeming the normal correction process as completed.

Contents of Processing of Synchronization Control

Figure 4:
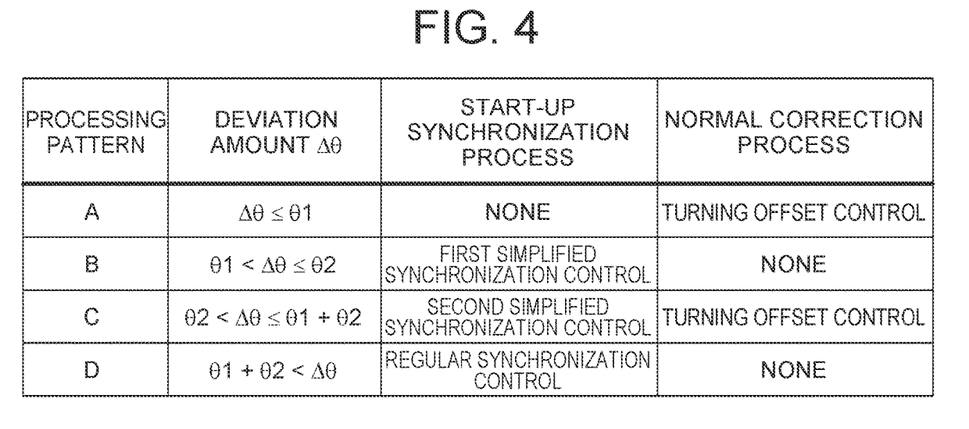
FIG. 4 is a table describing the contents of processing of the synchronization control.

As shown in FIG. 4, the steering control device 1 executes the synchronization control in four types of processing patterns A, B, C, and D based on the magnitude of the deviation amount Δθ.

Processing Pattern A

The synchronization control is executed in processing pattern A when the deviation amount Δθ is equal to or smaller than the first threshold value θ1 ("Δθ≤θ1" in FIG. 4). In this case, the steering-side synchronization control is not executed ("none" in FIG. 4) in the start-up synchronization process, and the turning offset control is executed as the turning-side synchronization control in the normal correction process.

Operation Mode of Processing Pattern A

Figure 5:
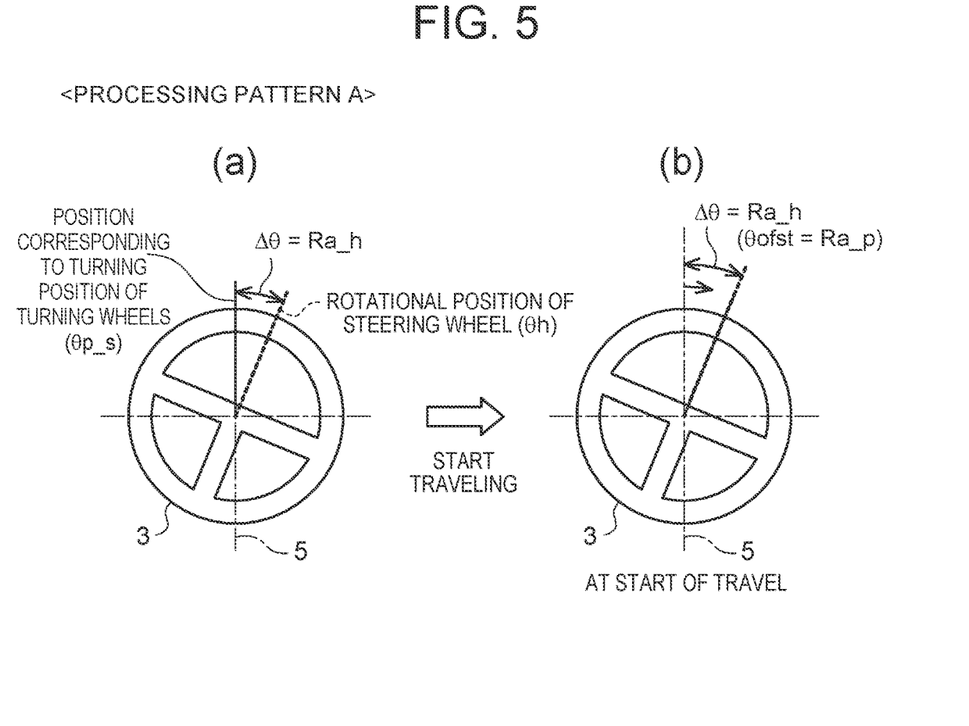
FIG. 5 is a view of which portions (a) and (b) illustrate an operation mode of processing pattern A in relation to the synchronization control.

As a precondition, for example, as shown in portion (a) of FIG. 5, the steering angle θh has deviated from the turning-converted angle θp_s, obtained based on the steering angle ratio as a value corresponding to the pinion angle θp, toward the right side that is the positive value side immediately after the start switch 42 is turned on. Thus, the deviation amount Δθ of the rotational position of the steering wheel 3 from the turning-converted angle θp_s is an angle Ra_h that has a value equal to or smaller than the first threshold value θ1. In this case, the steering-side synchronization control for the steering wheel 3 is not executed, and the vehicle is made to start traveling while having the angle Ra_h as the deviation amount Δθ.

Then, as shown in portion (b) of FIG. 5, at the start of travel of the vehicle, the offset amount θofst is an angle Ra_p that is obtained as a value corresponding to the angle Ra_h of the deviation amount Δθ. Subsequently, the turning offset control for the turning wheels 5 is executed immediately after the vehicle starts traveling, so that the turning position of the turning wheels 5 is corrected to be in the predetermined correspondence relationship with the rotational position of the steering wheel 3 such that the angle Ra_p as the offset amount θofst assumes a zero value. For example, when the rotational position of the steering wheel 3 is to be held at the rotational position at which the deviation amount Δθ is the angle Ra_h, the turning wheels 5 are turned toward the right side that is the positive value side by the angle Ra_p.

Processing Pattern B

The synchronization control is executed in processing pattern B when the deviation amount Δθ is larger than the first threshold value θ1 and equal to or smaller than the second threshold value θ2 (θ1<Δθ≤θ2). In this case, the first simplified synchronization control is executed in the start-up synchronization process, and the steering-side synchronization control is not executed ("none" in FIG. 4) in the normal correction process.

Operation Mode of Processing Pattern B

Figure 6:
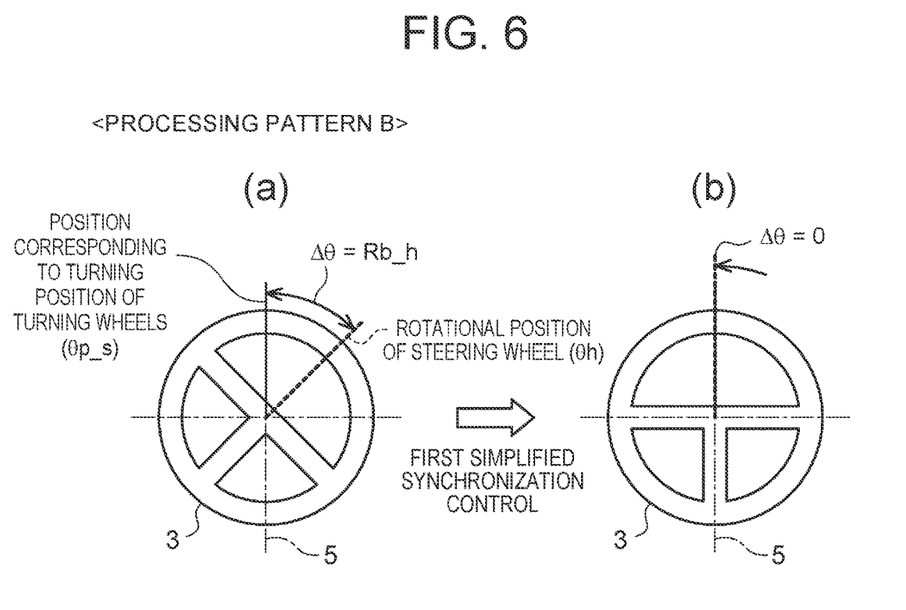
FIG. 6 is a view of which portions (a) and (b) illustrate an operation mode of processing pattern B in relation to the synchronization control.

As a precondition, for example, as shown in portion (a) of FIG. 6, the steering angle θh has deviated from the turning-converted angle θp_s, obtained based on the steering angle ratio as a value corresponding to the pinion angle θp, toward the right side that is the positive value side immediately after the start switch 42 is turned on. Thus, the deviation amount $\Delta\theta$ of the rotational position of the steering wheel 3 from the turning-converted angle $\theta p\_s$ is an angle Rb_h that has a value larger than the first threshold value $\theta 1$ and equal to or smaller than the second threshold value $\theta 2$. In this case, the first simplified synchronization control is executed before the vehicle starts traveling to thereby rotate the steering wheel 3 such that the deviation amount $\Delta\theta$ assumes a zero value.

Then, as shown in portion (b) of FIG. 6, the first simplified synchronization control for the steering wheel 3 is executed, so that the rotational position of the steering wheel 3 is corrected to be in the predetermined correspondence relationship with the turning position of the turning wheels 5 such that the angle Rb_h assumes a zero value as the deviation amount $\Delta\theta$. Thus, the rotational position of the steering wheel 3 is rotated toward the left side that is the negative value side by the angle Rb_h.

Processing Pattern C

The synchronization control is executed in processing pattern C when the deviation amount $\Delta\theta$ is larger than the second threshold value $\theta 2$ and equal to or smaller than the sum of the threshold values $\theta 1$, $\theta 2$ ($\theta 2<\Delta\theta\leq\theta 1+\theta 2$). In this case, the second simplified synchronization control is executed in the start-up synchronization process, and the turning offset control is executed in the normal correction process.

Operation Mode of Processing Pattern C

Figure 7:
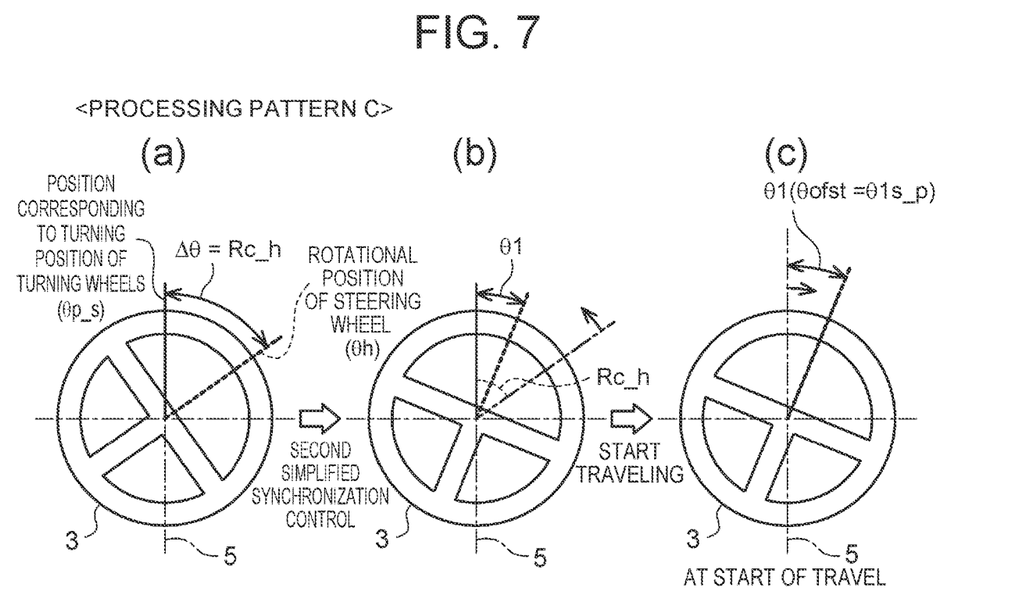
FIG. 7 is a view of which portions (a) to (c) illustrate an operation mode of processing pattern C in relation to the synchronization control.

As a precondition, for example, as shown in portion (a) of FIG. 7, the steering angle $\theta h$ has deviated from the turning-converted angle $\theta p\_s$, obtained based on the steering angle ratio as a value corresponding to the pinion angle $\theta p$, toward the right side that is the positive value side immediately after the start switch 42 is turned on. Thus, the deviation amount $\Delta\theta$ of the rotational position of the steering wheel 3 from the turning-converted angle $\theta p\_s$ is an angle Rc_h that has a value larger than the second threshold value $\theta 2$ and equal to or smaller than the sum of the threshold values $\theta 1$, $\theta 2$. In this case, the second simplified synchronization control is executed before the vehicle starts traveling to thereby rotate the steering wheel 3 such that the deviation amount $\Delta\theta$ assumes the first threshold value $\theta 1$.

Then, as shown in portion (b) of FIG. 7, the second simplified synchronization control for the steering wheel 3 is executed, so that the rotational position of the steering wheel 3 is corrected to be in the predetermined correspondence relationship with the turning position of the turning wheels 5 such that the deviation amount $\Delta\theta$ assumes the first threshold value $\theta 1$. Thus, the rotational position of the steering wheel 3 is moved toward the left side that is the negative value side such that the first threshold value $\theta 1$ remains as the deviation amount $\Delta\theta$. Here, the steering-side synchronization control for the steering wheel 3 is deemed as completed, and the vehicle is made to start traveling while having the first threshold value $\theta 1$ as the deviation amount $\Delta\theta$.

Thereafter, as shown in portion (c) of FIG. 7, at the start of travel of the vehicle, the offset amount $\theta ofst$ is an angle $\theta 1s\_p$ that is obtained as a value corresponding to the first threshold value $\theta 1$ of the deviation amount $\Delta\theta$. Subsequently, the turning offset control for the turning wheels 5 is executed immediately after the vehicle starts traveling, so that, as in the pattern described with portion (b) of FIG. 5, the turning position of the turning wheels 5 is corrected to be in the predetermined correspondence relationship with the rotational position of the steering wheel 3. Thus, when the rotational position of the steering wheel 3 is to be held at the rotational position at which the deviation amount $\Delta\theta$ is the first threshold value $\theta 1$, the turning wheels 5 are turned toward the right side that is the positive value side by the angle $\theta 1s\_p$.

Processing Pattern D

When the deviation amount $\Delta\theta$ is larger than the sum of the threshold values $\theta 1$, $\theta 2$ ($\theta 1+\theta 2<\Delta\theta$), the synchronization control is executed in processing pattern D. In this case, the regular synchronization control is executed in the start-up synchronization process and the turning-side synchronization control is not executed ("none" in FIG. 4) in the normal correction process.

Operation Mode of Processing Pattern D

Figure 8:
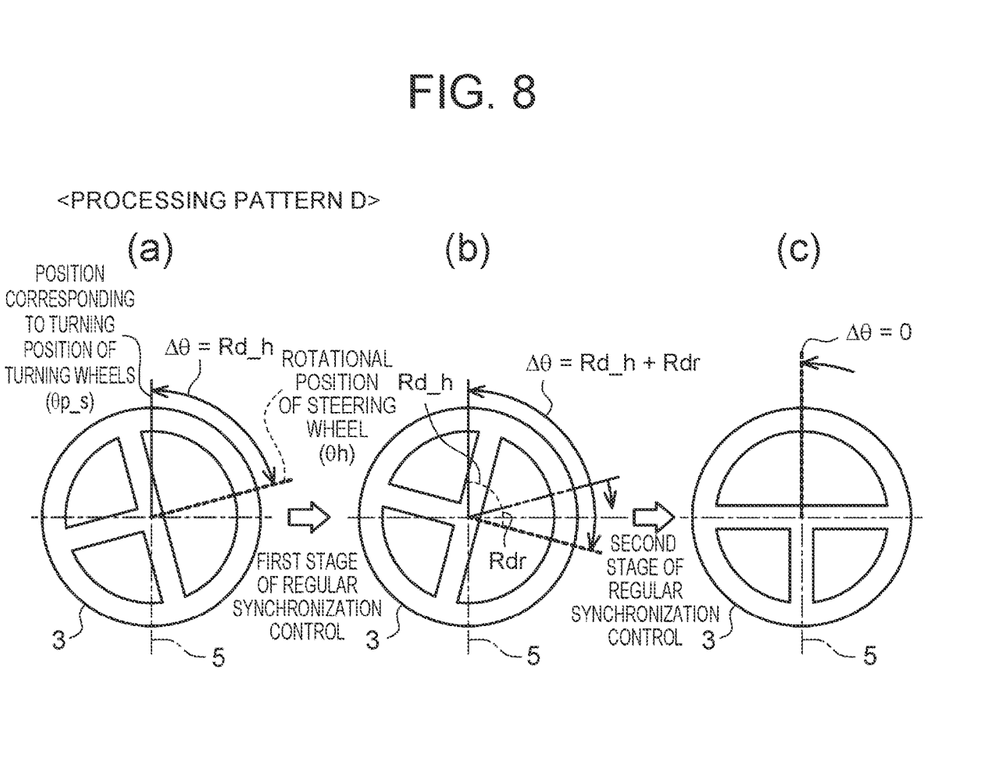
FIG. 8 is a view of which portions (a) to (c) illustrate an operation mode of processing pattern D in relation to the synchronization control.

As a precondition, for example, as shown in portion (a) of FIG. 8, the steering angle $\theta h$ has deviated from the turning-converted angle $\theta p\_s$, obtained based on the steering angle ratio as a value corresponding to the pinion angle $\theta p$, toward the right side that is the positive value side immediately after the start switch 42 is turned on. Thus, the deviation amount $\Delta\theta$ of the rotational position of the steering wheel 3 from the turning-converted angle $\theta p\_s$ is an angle Rd_h that has a larger value than the sum of the threshold values $\theta 1$, $\theta 2$. In this case, the regular synchronization control is executed before the vehicle starts traveling to thereby rotate the steering wheel 3 such that the deviation amount $\Delta\theta$ assumes a zero value.

Then, as shown in portion (b) of FIG. 8, the first stage of the regular synchronization control for the steering wheel 3 is executed. By the first stage of the regular synchronization control, the rotational position of the steering wheel 3 is corrected so as to further deviate from the predetermined correspondence relationship with the turning position of the turning wheels 5 such that the deviation amount $\Delta\theta$ increases temporarily. Specifically, the rotational position of the steering wheel 3 is moved toward the right side that is the positive value side so as to deviate by an angle Rdr as a predetermined amount. In this case, the deviation amount $\Delta\theta$ increases temporarily to the sum of the angles Rd_h, Rdr that has a larger value than the angle Rd_h.

Subsequently, as shown in portion (c) of FIG. 8, the second stage of the regular synchronization control for the steering wheel 3 is executed. By the second stage of the regular synchronization control, the rotational position of the steering wheel 3 is corrected to be in the predetermined correspondence relationship with the turning position of the turning wheels 5 such that the sum of the angles Rd_h, Rdr that has increased temporarily as the deviation amount $\Delta\theta$ assumes a zero value. In this case, the rotational position of the steering wheel 3 is moved toward the left side that is the negative value side by the sum of the angles Rd_h, Rdr.

Workings of Embodiment

According to the embodiment, the turning offset control of the turning-side synchronization control has the advantage of being able to perform a correction process on the positional relationship between the steering wheel 3 and the turning wheels 5 while the steering wheel 3 is not rotated. This advantage can be utilized in a situation where the deviation amount $\Delta\theta$ is equal to or smaller than the first threshold value $\theta 1$.

For example, as shown in FIG. 4, the synchronization control in processing pattern A is specified for a situation where the deviation amount $\Delta\theta$ has a value equal to or smaller than the first threshold value $\theta 1$. In this case, as shown in portions (a) and (b) of FIG. 5, the vehicle is made to start traveling while having the first threshold value $\theta 1$ as the deviation amount $\Delta\theta$, and the turning position of the turning wheels 5 is corrected such that the positional relationship between the steering wheel 3 and the turning wheels 5 meets the predetermined correspondence relationship after the start of travel. Thus, by not executing the synchronization control before the vehicle starts traveling, the period from when the start switch 42 is turned on until the vehicle starts traveling is shortened. In addition, since the steering wheel 3 is not automatically rotated, this pattern is less likely to cause discomfort to the driver.

The regular synchronization control of the steering-side synchronization control has the advantage of being able to easily perform a correction process on the positional relationship between the steering wheel 3 and the turning wheels 5. This advantage can be utilized in a situation where the deviation amount Δθ has a value larger than the sum of the threshold values θ1, θ2.

For example, as shown in FIG. 4, the synchronization control in processing pattern D is specified for a situation where deviation amount Δθ has a value larger than the sum of the threshold values θ1, θ2. In this case, as shown in portions (a) to (c) of FIG. 8, the rotational position of the steering wheel 3 is corrected such that the positional relationship between the steering wheel 3 and the turning wheels 5 meets the predetermined correspondence relationship before the vehicle starts traveling. The steering wheel 3 rotates by two actions of rotating toward the right side that is the positive value side and then rotating toward the left side that is the negative value side as basic actions. Thus, a correction process on the positional relationship between the steering wheel 3 and the turning wheels 5 can be easily performed, as it involves simply rotating the steering wheel 3. The driver can be made aware that when the steering wheel 3 is to be greatly rotated, this is done by two actions as basic actions, so that even rotating the steering wheel 3 relatively greatly is less likely to cause discomfort to the driver.

In a situation where the deviation amount Δθ has a value larger than the first threshold value θ1 and equal to or smaller than the sum of the threshold values θ1, θ2, at least one of the turning-side synchronization control and the steering-side synchronization control is specified to be executed, so that the advantage of each mode of control can be utilized according to the required result.

Specifically, in a situation where the deviation amount Δθ has a value larger than the second threshold value θ2 among values that are larger than the first threshold value θ1 and equal to or smaller than the sum of the threshold values θ1, θ2, the advantages of the turning offset control of the turning-side synchronization control and the second simplified synchronization control of the steering side synchronization control can be utilized.

For example, as shown in FIG. 4, the synchronization control in processing pattern C is specified for a situation where the deviation amount Δθ has a value larger than the second threshold value θ2 and equal to or smaller than the sum of the threshold values θ1, θ2. In this case, as shown in portions (a) and (b) of FIG. 7, the rotational position of the steering wheel 3 is corrected such that the deviation amount Δθ of the positional relationship between the steering wheel 3 and the turning wheels 5 decreases to the first threshold value θ1 before the vehicle starts traveling. Then, the steering wheel 3 rotates by one action of rotating in one of the leftward and rightward directions.

Thereafter, as shown in portion (c) of FIG. 7, the vehicle is made to start traveling while having the first threshold value θ1 as the deviation amount Δθ, and the turning position of the turning wheels 5 is corrected such that the positional relationship between the steering wheel 3 and the turning wheels 5 meets the predetermined correspondence relationship after the start of travel.

Thus, the degree of rotation of the steering wheel 3 is restricted to a minimum degree, so that rotating the steering wheel 3 is less likely to cause discomfort to the driver and the period from when the start switch 42 is turned on until the vehicle starts traveling is shortened.

In a situation where the deviation amount Δθ has a value equal to or smaller than the second threshold value θ2 among values that are larger than the first threshold value θ1 and equal to or smaller than the sum of the threshold values θ1, θ2, the advantage of the first simplified synchronization control of the steering-side synchronization control can be utilized.

For example, as shown in FIG. 4, the synchronization control in processing pattern B is specified for a situation where the deviation amount Δθ has a value larger than the first threshold value θ1 and equal to or smaller than the second threshold value θ2. In this case, as shown in portions (a) and (b) of FIG. 6, the rotational position of the steering wheel 3 is corrected such that the positional relationship between the steering wheel 3 and the turning wheels 5 meets the predetermined correspondence relationship before the vehicle starts traveling. In this case, the steering wheel 3 rotates by one action of rotating in one of the leftward and rightward directions. Thus, although the steering wheel 3 is rotated before the vehicle starts traveling, the rotation is completed in a short time compared with when the steering wheel 3 is rotated by two actions.

Effects of Embodiment

In this embodiment, as the method of performing a correction process on the positional relationship between the steering wheel 3 and the turning wheels 5, a method that utilizes the advantages of the turning-side synchronization control and the steering-side synchronization control can be proposed.

The correction process involving two actions of the regular synchronization control of the steering-side synchronization control has the advantage of being less likely to cause discomfort to the driver even when the steering wheel 3 is rotated relatively greatly. On the other hand, the correction process involving one action of each mode of simplified synchronization control of the steering-side synchronization control has the advantage of being able to complete the correction process on the rotational position of the steering wheel 3 in a short time compared with the correction process involving two actions. In this case, the advantage of the correction process involving two actions can be utilized in a situation where the deviation amount Δθ has a value larger than the sum of the threshold values θ1, θ2. The advantage of the correction process involving one action can be utilized in a situation where the deviation amount Δθ has a value equal to or smaller than the sum of the threshold values θ1, θ2. This configuration is effective for utilizing the advantage of each correction process of the steering-side synchronization control that involves one or two actions.

In a situation where the deviation amount Δθ has a value larger than the second threshold value θ2 and equal to or smaller than the sum of the threshold values θ1, θ2, the advantages of the turning offset control and the correction process involving one action of the steering-side synchronization control can be utilized. In a situation where the deviation amount Δθ has a value larger than the first threshold value θ1 and equal to or smaller than the second threshold value θ2, the advantage of the correction process involving one action of the steering-side synchronization control can be utilized. This configuration is effective for utilizing the advantages of the turning-side synchronization control and the steering-side synchronization control.

In particular, in a situation where the deviation amount Δθ has a value larger than the second threshold value θ2 and equal to or smaller than the sum of the threshold values θ1, θ2, the advantage of the correction process involving one action can be more suitably utilized. This configuration is effective from the viewpoint of easily performing a correction process on the positional relationship between the steering wheel 3 and the turning wheels 5.

The turning offset control of the turning-side synchronization control has the advantage of being able to shorten the time taken for the vehicle to start traveling after the start switch 42 is turned on. This advantage can be more effectively utilized in a situation where the deviation amount Δθ has a value equal to or smaller than the first threshold value θ1. The regular synchronization control and each mode of simplified synchronization control of the steering-side synchronization control have an advantage in that the vehicle's behavior is less likely to cause discomfort to the driver. This advantage can be more effectively utilized in a situation where the deviation amount Δθ has a value larger than the first threshold value θ1. In this case, the correction process on the positional relationship between the steering wheel 3 and the turning wheels 5 can produce both a shortening effect on the period from when the start switch 42 is turned on until the vehicle starts traveling and a reducing effect on the likelihood of the vehicle's behavior causing discomfort to the driver.

Other Embodiments

The above-described embodiment may be changed as follows. The following other embodiments can be combined with one another within such a range that no technical inconsistency arises.

Regarding the steering-side synchronization control, the regular synchronization control can also be specified as a correction process involving one action of rotating the steering wheel 3 in one direction, as with each mode of simplified synchronization control. Regarding the steering-side synchronization control, in the regular synchronization control, an angle obtained by further shifting one of the steering angle θh and the synchronization target steering angle θh* that is located on the negative value side toward the negative value side by a predetermined amount can also be calculated as the relay target steering angle θhr*. In the regular synchronization control, the method of calculating the relay target steering angle θhr* may be changed according to the positional relationship between the steering angle θh and the synchronization target steering angle θh*. Further, in the regular synchronization control, the relay target steering angle θhr* can also be calculated such that the steering angle θh temporarily exceeds the synchronization target steering angle θh* in the first stage of the regular synchronization control.

Regarding the steering-side synchronization control, each mode of simplified synchronization control can also be specified as a correction process involving two actions of rotating the steering wheel 3 in one direction and then rotating it in the opposite direction from the one direction, as with the regular synchronization control.

Regarding the steering-side synchronization control, the control may be gradually reflected in the rotation of the steering wheel 3 while the steering wheel 3 is steered after the start switch 42 is turned on and the vehicle starts traveling, as with the turning offset control.

Regarding the turning offset control of the normal correction process, the reduction process of the offset amount θofst can also be executed at a timing when the vehicle is braked or stopped after the vehicle starts traveling. Regarding the turning offset control of the normal correction process, the reduction process of the offset amount θofst can also be executed at a timing before the vehicle starts traveling, provided that the timing is after the start switch 42 is turned on and the start-up synchronization process by the steering-side control unit 50 is completed. In this case, the turning offset control may be executed while the steering wheel 3 is steered even before the vehicle starts traveling. Further, the turning offset control may be executed after completion of the start-up synchronization process, following the start-up synchronization process regardless of the circumstances.

The synchronization control may be executed in processing pattern B or processing pattern D when the deviation amount Δθ is larger than the second threshold value θ2 and equal to or smaller than the sum of the threshold values θ1, θ2. In this case, the configuration of executing the synchronization control in processing pattern C can be omitted. This embodiment is effective for meeting the requirement of bringing the positional relationship between the steering angle θh and the pinion angle θp as close to the predetermined correspondence relationship as possible before the vehicle starts traveling.

The synchronization control may be executed in processing pattern A or processing pattern C when the deviation amount Δθ is larger than the first threshold value θ1 and equal to or smaller than the second threshold value θ2. In this case, the configuration of executing the synchronization control in processing pattern B can be omitted. This embodiment is effective for meeting the requirement of shortening the period from when the start switch 42 is turned on until the vehicle starts traveling as much as possible.

The synchronization control may be configured such that when the deviation amount Δθ is equal to a minimum threshold value θmin that is even smaller than the first threshold value θ1, neither of the turning-side synchronization control and the steering-side synchronization control is executed. For example, the minimum threshold value θmin is set as a value within a range that is experimentally obtained such that even when the vehicle is made to start traveling while having the deviation amount Δθ, this behavior of the vehicle is even less likely to cause discomfort to the driver. In this case, a situation where the synchronization control itself is not executed after the start switch 42 is turned on can be created.

In the synchronization control of processing pattern C, a correction process may be performed on the rotational position of the steering wheel 3 to an extent corresponding to half of the value of the deviation amount Δθ through the second simplified synchronization control, and then a correction process may be performed on the turning position of the turning wheels 5 through the turning offset control. Further, in the synchronization control of processing pattern C, a correction process may be performed on the rotational position of the steering wheel 3 to an extent corresponding to the second threshold value θ2 through the second simplified synchronization control, and then a correction process may be performed on the turning position of the turning wheels 5 through the turning offset control.

A notification device that notifies the driver that the steering-side synchronization control is being executed may be provided inside the vehicle cabin, for example, in the instrument panel. Examples of notification actions of the notification device include displaying a message by characters, generating a message by voice, and generating an electronic sound. Thus, the driver can know that the steering wheel 3 is about to rotate automatically or that the steering wheel 3 that is rotating automatically is about to stop. This embodiment is effective for reducing the likelihood of the steering-side synchronization control causing discomfort to the driver.

The steering angle ratio is set to an appropriate value according to the product specifications or the like. For example, the steering angle ratio may be such that "θh:θi," i.e., "θh:θp," is "1:1" or "1:3." When "θh:θp" is "1:3," a 10° change in the steering angle θh is accompanied by a 30° change in the turning angle θi. When "θh:θp" is "1:1," the turning-converted angle θp_s and the pinion angle θp basically match. In this case, in step S10 of the start-up synchronization process, the deviation amount Δθ can be obtained as the absolute value of the difference between the steering angle θh and the pinion angle θp. Further, the target pinion angle θp* used in the turning-side control during energization basically matches the steering angle θh. Thus, in step S20 of the normal correction process, the offset amount θofst can be obtained by subtracting the pinion angle θp from the steering angle θh.

In the steering control device 1, a single control unit may be formed that has functions in which the function of the steering-side control unit 50 operating the steering-side motor 13 and the function of the turning-side control unit 60 operating the turning-side motor 32 are consolidated. In this case, the processes involved in the synchronization control can be configured such that the process corresponding to steps S20, S22 of the normal correction process is executed after the process corresponding to the determination of YES in step S11 of the start-up synchronization process. Further, the processes involved in the synchronization control can be configured such that the process corresponding to steps S20, S22 of the normal correction process is executed after the process corresponding to step S16 of the start-up synchronization process.

When calculating the target reaction force torque, the steering-side control unit 50 should use at least a state variable that changes according to the operation state of the steering wheel 3. In this case, instead of using the vehicle speed V or the steering torque Th, the steering-side control unit 50 may use other elements or a combination of other elements.

The steering-side control unit 50 may calculate, as the target reaction force torque, a value that is calculated by executing torque feedback control of adapting the steering torque Th to the target steering torque calculated based on the steering torque Th.

The steering-side control unit 50 may calculate the steering angle θh by taking an amount of twisting of the steering shaft 11 according to the steering torque Th into account and factoring in this amount of twisting in the rotation angle θs through addition, subtraction, or the like.

As the steering angle θh, a detection result of a steering sensor that is provided on the steering shaft 11 to detect the rotation angle of the steering shaft 11 may be used. As the pinion angle θp, a detection result of a pinion angle sensor that is provided on the pinion shaft 21 to detect the rotation angle of the pinion shaft 21 may be used.

In the above embodiment, as the turning-side motor 32, for example, a motor that is disposed on the same axis as the rack shaft 22, or a motor that is connected through the worm and wheel set to the pinion shaft constituting the rack-and-pinion mechanism together with the rack shaft 22 may be adopted.

In the above embodiment, the steering control device 1 can be formed by a processing circuit including (1) one or more processors that operate in accordance with a computer program (software), (2) one or more dedicated hardware circuits, such as application-specific integrated circuits (ASICs) that execute at least some of various processes, or (3) a combination of (1) and (2). The processor includes a CPU and a memory, such as an RAM or an ROM, and the memory stores program codes or commands configured to cause the CPU to execute a process. Examples of the memory, i.e., a non-transitory computer-readable medium, include all available media that can be accessed by a general-purpose or special-purpose computer.

In the above embodiment, the steering device 2 has a linkless structure in which the steering section 4 and the turning section 6 are mechanically cut off at all times. However, the structure of the steering device 2 is not limited to this example and may instead be a structure in which the steering section 4 and the turning section 6 can be mechanically cut off from each other by a clutch. In addition, the steering device 2 may have an independently turnable structure in which the left and right turning wheels 5 of the turning section 6 can be independently turned.

What is claimed is:

1. A steering control device that controls, as a target, a steering device including a steering actuator that operates to apply a steering reaction force to a steering wheel of a vehicle and a turning actuator that has a structure with a power transmission path mechanically separated from the steering actuator and that operates to turn turning wheels of the vehicle, the steering control device comprising a control unit that executes synchronization control for controlling an operation of at least one of the steering actuator and the turning actuator such that a positional relationship between a rotational position of the steering wheel and a turning position of the turning wheels meets a predetermined correspondence relationship, wherein:

the control unit is configured to execute one or more processes including:

a deviation amount determination process of determining a magnitude of an absolute value of a deviation amount of the positional relationship from the predetermined correspondence relationship upon power to the vehicle being turned on, and a synchronization control process of, based on a determination result of the deviation amount determination process, executing the synchronization control via at least one of a turning-side synchronization control of performing a correction process on the turning position of the turning wheels by operating the turning actuator and a steering-side synchronization control of performing a correction process on the rotational position of the steering wheel by operating the steering actuator; and the control unit is configured to execute, in the synchronization control process:

the turning-side synchronization control when the absolute value of the deviation amount is a value within a first range;

the steering-side synchronization control when the absolute value of the deviation amount is a value within a second range that is larger than the value within the first range; and at least one of the turning-side synchronization control and the steering-side synchronization control when the absolute value of the deviation amount is a value within a third range that is between the value within the first range and the value within the second range.

2. The steering control device according to claim 1, wherein:

the control unit is configured to execute the steering-side synchronization control when the absolute value of the deviation amount is the value within the second range or the value within the third range; and the control unit is configured such that the steering-side synchronization control when the absolute value of the deviation amount is the value within the second range is executed as a correction process involving two actions of rotating the steering wheel in one direction and then rotating the steering wheel in a direction opposite from the one direction, and such that the steering-side synchronization control when the absolute value of the deviation amount is the value within the third range is executed as a correction process involving one action of rotating the steering wheel in one direction.

3. The steering control device according to claim 1, wherein the control unit is configured to execute, of the turning-side synchronization control and the steering-side synchronization control, the steering-side synchronization control when the absolute value of the deviation amount is a value within a fourth range that is a relatively small value among values within the third range, and to execute both the turning-side synchronization control and the steering-side synchronization control when the absolute value of the deviation amount is a value within a fifth range that is a relatively large value among the values within the third range.

4. The steering control device according to claim 3, wherein the control unit is configured to execute, as the turning-side synchronization control and the steering-side synchronization control when the absolute value of the deviation amount is the value within the fifth range, the steering-side synchronization control until the absolute value of the deviation amount assumes the value within the first range and the turning-side synchronization control after the absolute value of the deviation amount assumes the value within the first range.

5. The steering control device according to claim 1, wherein the control unit is configured to, when executing the turning-side synchronization control, perform the correction process on the turning position of the turning wheels after the power to the vehicle is turned on and the vehicle starts traveling, and when executing the steering-side synchronization control, perform the correction process on the rotational position of the steering wheel after the power to the vehicle is turned on and before the vehicle starts traveling.

* * * * *